US007024121B2

(12) United States Patent
Rikitake et al.

(10) Patent No.: US 7,024,121 B2
(45) Date of Patent: Apr. 4, 2006

(54) OPTICAL CLOCK SIGNAL DISTRIBUTION SYSTEM IN WDM NETWORK

(75) Inventors: Nobuhiro Rikitake, Kawasaki (JP); Hirotaka Morita, Kawasaki (JP); Koji Takeguchi, Kawasaki (JP); Ryuichi Moriya, Kawasaki (JP); Hideki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/274,537

(22) Filed: Oct. 17, 2002

(65) Prior Publication Data

US 2003/0059160 A1 Mar. 27, 2003

Related U.S. Application Data

(63) Continuation of application No. PCT/JP00/02578, filed on Apr. 19, 2000.

(51) Int. Cl.
*H04J 14/02* (2006.01)

(52) U.S. Cl. ........................................ 398/154; 359/124

(58) Field of Classification Search ................. 398/154; 357/107

See application file for complete search history.

(56) References Cited

U.S. PATENT DOCUMENTS

| | | | |
|---|---|---|---|
| 5,543,951 A | 8/1996 | Moehrmann | |
| 5,615,035 A | 3/1997 | Koai | |
| 6,396,607 B1 * | 5/2002 | Cao | 398/154 |
| 6,741,812 B1 | 5/2004 | Wolf | |

FOREIGN PATENT DOCUMENTS

| | | |
|---|---|---|
| EP | 0 481 349 A2 | 4/1992 |
| EP | 0 910 189 A2 | 4/1999 |
| EP | 1 107 497 | 6/2001 |
| JP | 58-66442 | 4/1983 |
| JP | 59-172844 | 9/1984 |
| JP | 64-51736 | 2/1989 |
| JP | 1-144832 | 6/1989 |
| JP | 1-233936 | 9/1989 |
| JP | 5-227098 | 9/1993 |
| JP | 5-252180 | 9/1993 |
| JP | 5-335904 | 12/1993 |
| JP | 7-79216 | 3/1995 |
| JP | 7-162977 | 6/1995 |
| JP | 8-125617 | 5/1996 |
| JP | 9-102991 | 4/1997 |
| JP | 10-322379 | 12/1998 |
| JP | 11-122207 | 4/1999 |
| JP | 2000-029561 | 1/2000 |

OTHER PUBLICATIONS

Supplementary European Search Report dated May 3, 2005.

* cited by examiner

*Primary Examiner*—Douglas Wille
(74) *Attorney, Agent, or Firm*—Katten Muchin Rosenman, LLP

(57) ABSTRACT

Proposed is an optical clock distribution system in the WDM network, which particularly relates to a system to control clock synchronization between optical transmission devices constituting an optical communication network. The optical clock distribution system includes an optical clock generator converting a clock signal of PRC (Primary Reference Clock) level into an optical clock signal having a wavelength λ0; a wavelength multiplexer wavelength-multiplexing the optical clock signal having wavelength λ0 together with other optical wavelength data; and a wavelength-demultiplexer provided in a unit of the network, wavelength-demultiplexing the optical clock signal having wavelength λ0, wherein the other optical wavelength data are processed in the unit of the network using the wavelength-demultiplexed optical clock signal having wavelength λ0 as a reference clock.

9 Claims, 11 Drawing Sheets

OPTICAL CLOCK SIGNAL DISTRIBUTION SYSTEM IN WDM NETWORK

This application is a continuation of international application number PCTJP00/02578, filed Apr. 19, 2000.

BACKGROUND OF THE INVENTION

1. Field of the Invention

The present invention relates to an optical clock distribution system in a wavelength division multiplexing (WDM) network and more particularly a system for controlling clock synchronization between optical transmission units constituting an optical communication network.

2. Prior Arts

Currently, voice and data are transmitted in various forms such as STM (Synchronous Transfer Mode), ATM (Asynchronous Transfer Mode) and IP (Internet Protocol) through an optical communication network, in which an SDH (Synchronous Digital Hierarchy)/SONET (Synchronous Optical Network) system is employed as a backbone system.

Meanwhile, as a result of ongoing explosive increase of the Internet line demand in recent years, higher bit rate (ranging from 2.5 Gbps to 10 Gbps or 40 Gbps) of TDM (Time Division Multiplexing) has been introduced in each transmission unit, and at the same time efficient utilization of transmission capacity in an optical fiber cable has been in wide and active progress by introducing a WDM (Wavelength Division Multiplexing) system.

SDH/SONET is a system in which entire transmission units constituting a network are synchronized with a master clock. This system is now adopted worldwide as an appropriate communication system for implementing high-speed digital networks.

This method has various advantages such as improved connectivity between transmission units and efficient data multiplexing/demultiplexing processing. However, a clock source is required for outputting a reference clock having extremely high accuracy, which is referred to as PRC (Primary Reference Clock) in a SDH/SONET system, to be installed as a network clock source of the highest hierarchy (for example, a standard clock constituted by a cesium Cs atomic oscillator).

FIG. 1 shows a conceptual diagram of a synchronous architecture in a network employing a highly accurate clock source.

In this FIG. 1, a synchronous configuration in a network is shown. A clock signal being output from a hierarchically highest clock source 100 having an accuracy level of PRC is distributed to each transmission unit 101, 102 as a reference clock. In the following description, this clock signal having PRC-level accuracy is simply referred to as a reference clock.

Each transmission unit 101, 102 receives the reference clock being output from clock source 100 to transfer to lower level units 103, 104 and also 105, 106. As a result, a plurality (N) of transmission units 101–10N in the network are entirely synchronized with one reference clock, thus constituting a synchronous system.

Thus, in the SDH/SONET system, each transmission unit normally extracts a timing signal from data received through an optical fiber cable so as to synchronize with the reference clock.

Each transmission unit then regenerates a clock in a PLL circuit provided therein, to transmit data to a succeeding transmission unit. Namely, a transmission unit regenerates a clock from a received data and then forwards a data including a clock signal to a succeeding unit.

Here, in the SDH/SONET system, performance is required in each transmission unit on how precisely the reference clock is to be transferred throughout the entire network maintaining the quality of the reference clock between the transmission units.

In order to cope with this requirement, in the conventional SDH/SONET system, one method shown in FIG. 2 is known as a means for transferring the reference clock originated from clock source 100 to each transmission unit. The method is as follows.

First, a clock of PRC-level accuracy being output from clock source 100 is input as an external reference clock (EXT CLK) into an SDH transmission unit 101 provided in a master station. A PLL circuit provided in SDH transmission unit 101 generates a unit master clock MCLK-1. SDH transmission unit 101 outputs a transmission data to a succeeding transmission unit 102 using the unit master clock MCLK-1.

Similarly, in SDH transmission unit 102, after a timing component is extracted from the received data, a PLL circuit provided in SDH transmission unit 102 generates a unit master clock MCLK-2. SDH transmission unit 102 outputs a transmission data to a succeeding SDH transmission unit 103 using the unit master clock M-CLK2.

In such a way, each plurality of SDH transmission units 101-10N transfers the reference clock originated in clock source 100 one after another, and thus the synchronization can be established throughout the entire network.

Here, in the standardized recommendations/regulations by ITU-T/BELLCORE or the like, there have been settled severe specifications in regard to the reference clock quality for transfer. A reference clock of PRC-level clock originated from clock source 100 is to be relayed in 20 SDH transmission units maximum, and each SDH transmission unit is to regenerate the clock to output using a PLL circuit provided therein.

In addition, one clock source 100 is normally provided for generating the reference clock to output. However, considering a possible failure of clock source 100, a standby (protection) clock source is often provided on the opposite transmission unit side (on the transmission unit 10N side) thus constituting a redundant configuration.

Also, although a network of linear configuration is shown in FIG. 2, a similar method to the above may be applied in a network of ring (circle-shaped) configuration to transfer a PRC-level reference clock, i.e. a master clock generated from clock source 100.

Here, as a property of such networks, as the number of SDH transmission units for repeating the reference clock from clock source 100 increases, the number of PLL circuits transferring the clock also increases, which results in deterioration in the reference clock quality. In ITU-T recommendations, considering the aforementioned effect, the maximum number of repeating units is specified to limit to 20, as mentioned earlier. Also, there is specified a requirement to provide a clock regeneration unit to suppress jitters and wanders for succeeding transmission exceeding the abovementioned limit. Further, the number of these clock regeneration units is specified up to 10.

SUMMARY OF THE INVENTION

Accordingly, as a result of an increase of the number of SDH transmission units i.e. the number of clock repeating units in a SDH/SONET system, it has become necessary to manage and eliminate the increased noise produced by a PLL circuit in each transmission unit.

Also, PLL circuits to be provided in each SDH transmission unit have different way of implementation depending on manufacturers thereof, producing various noise generation as well as noise pass bandwidth. Therefore, in an actual network, noise source discrimination and measures therefor become difficult, which produces a serious problem.

Various relevant problems raised in the aforementioned problem are summarized below:

(1) Accumulated noise (jitter/wander) is produced as a result of increased clock repeating by PLL circuits.

(2) There is different performance between clock regeneration circuits (PLL circuits etc.) produced by different manufacturers.

(3) Synchronization configurations become complicated due to complication in topological layout of transmission units configuring a network (such as a mesh configuration).

(4) Widespread use of measurement instruments for measuring noise as well as use of SSU units for supervising noise during operation is necessary.

(5) Overall response time in a network becomes elongated because of both PLL multi-stage connection configuration and elongated response time produced inside PLL caused by noise suppression. Time required for response and stabilization of the network against external disturbance becomes longer.

(6) As transmission distance becomes longer, performance requirements as well as problems against low-frequency noise (wander) become apparent.

(7) PRC unit (Cs oscillator) cost is high and an installation location of GPS unit is to be selected.

(8) Clock quality information (SSMB: Synchronous Status Message Byte) being currently used between transmission units does not represent quality itself. For example, though SSMB signifies a PRC source, clock quality being actually transmitted is not known.

(9) There is difficulty in design and evaluation of PLL circuit itself against a required specification as well as difficulty in controlling wander itself.

(10) In recent years, SDH system has begun to use more widely by adopting WDM system. In a future photonic system (OADM/OXC), network synchronization management will become more important.

Therefore, it is an object of the present invention to provide a system of transferring a reference clock throughout a WDM network without deterioration.

More specifically, it is an object of the present invention to provide a distribution system of an optical clock signal in a WDM network, and more particularly to provide a system for controlling clock synchronization between optical transmission units constituting an optical communication network.

As a preferred configuration according to the present invention, a system is constituted by; an optical clock generator converting a clock signal of PRC (Primary Reference Clock) level into an optical clock signal having a wavelength λ0; a wavelength multiplexer wavelength-multiplexing the optical clock signal having wavelength λ0 together with other optical wavelength data; and a wavelength demultiplexer of the optical clock signal having wavelength λ0 being provided in a unit of the network. In each unit of the network, other optical wavelength data are processed using the wavelength-demultiplexed optical clock signal having wavelength λ0 as a reference clock.

Further, as a preferred embodiment adopting a redundant configuration, a system is constituted by; a first clock signal source and a second clock signal source generating a first clock signal and a second clock signal respectively having PRC level; a first optical clock generator and a second optical clock generator respectively converting clock signals being output from the first and the second clock source into optical clock signals having a first wavelength and a second wavelength; a first optical transmission line and a second optical transmission line transmitting optical clock signals respectively having the first and the second wavelength being output from the first and the second optical clock generator; and a wavelength-demultiplexer for wavelength-demultiplexing the optical clock signals having the first and the second wavelength being provided in a unit of the network. Further, by providing a clock signal selector in each unit of the network for selecting a wavelength-demultiplexed optical clock signal having either the first or the second wavelength, a redundant configuration of an optical clock distribution system is attained.

Further scopes and features of the present invention will become more apparent by the following description of the embodiments with the accompanied drawings.

EMBODIMENTS

The preferred embodiments of the present invention are described hereafter referring to the charts and drawings, wherein like numerals or symbols refer to like parts.

Figure 1:
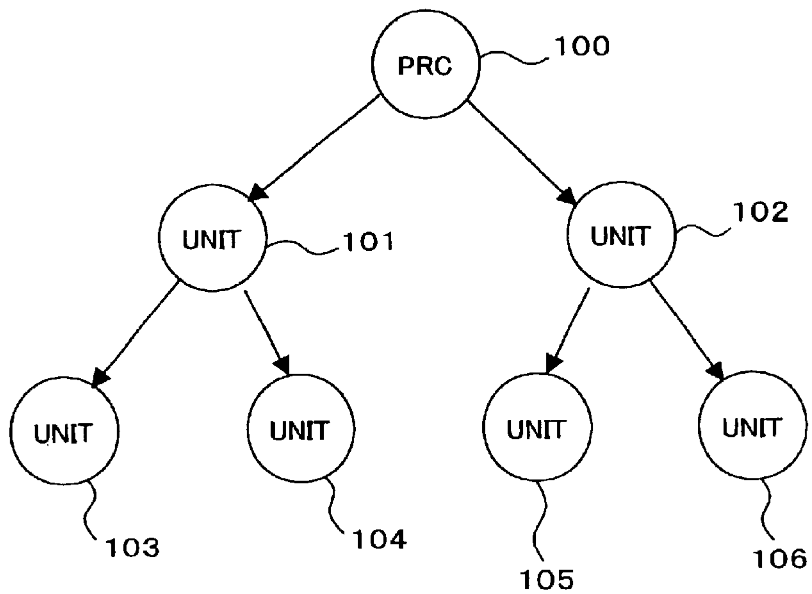
FIG. 1 shows a conceptual diagram of synchronization architecture in a network using a highly accurate clock source.
Figure 2:
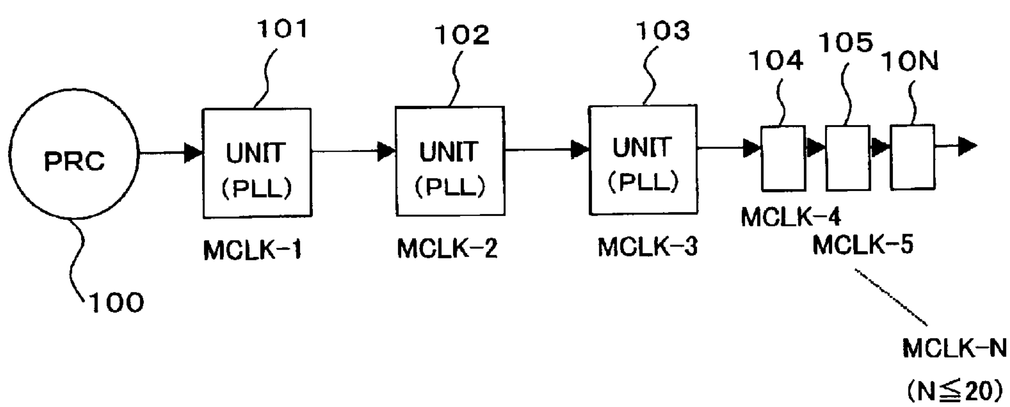
FIG. 2 shows an example of a method for transferring a reference clock of PRC level from a clock source to transmission units.
Figure 3:
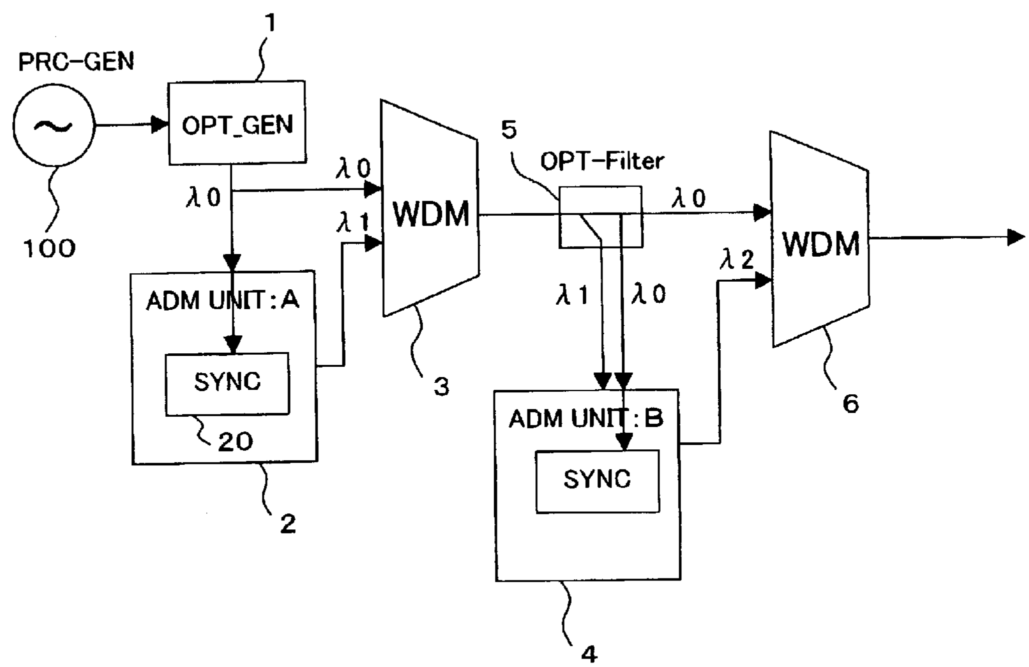
FIG. 3 shows a conceptual configuration diagram of a transmission system employing the present invention.

FIG. 3 shows a conceptual configuration diagram of a transmission system according to the present invention. In this system, a PRC-level clock being output from a clock source 100 is transmitted from ADM (Add Drop Multiplexing) units 2, 4 in an optical signal form without providing a clock regenerative repeating function, so that the network is operated in synchronization with one reference clock.

Clock source (PRC-GEN) 100 of PRC-level accuracy functioning as a network reference clock is constituted by, for example, a cesium atomic oscillator.

The reference clock is converted into an optical clock signal by means of an optical clock signal generator (OPT-GEN) 1. A wavelength converted into an optical clock signal is defined as λ0. ADM unit 2 receives the optical clock signal having wavelength λ0 to define as a reference clock in the unit. Also, an optical signal including main signal data is transmitted from ADM unit 2 with a wavelength λ1.

Here, the output optical signal having wavelength λ1 is a signal being synchronized into wavelength λ0 in a synchronization portion 20. These two wavelengths λ0 an λ1 are optically multiplexed into one optical signal being transmitted through a single optical fiber line in a wavelength multiplexing (WDM) unit 3, to forward to a succeeding node.

In ADM unit 4 provided in the succeeding node, the wavelength λ0 is demultiplexed by an optical filter (OPT-Filter) 5 to feed as a reference clock for use in ADM unit 4. Using this reference clock, a main signal data having wavelength λ0 is processed.

The main signal data having been processed is transmitted from ADM unit 4 to a succeeding node using a wavelength of either λ1 or λ2. Here, the main signal data having wavelength λ1 or λ2 is wavelength-multiplexed with the reference clock of wavelength λ0 in a wavelength multiplexing unit 6.

In such a way, according to the present invention, a reference clock can be distributed throughout a network without regenerative repeating. At the same time, any ADM units in the nodes can directly face to clock source 100 without intervention of intermediate units. Accordingly, it becomes possible to relay clock signals without being influenced by a network configuration, clock regeneration capability in each unit, etc.

Figure 4:
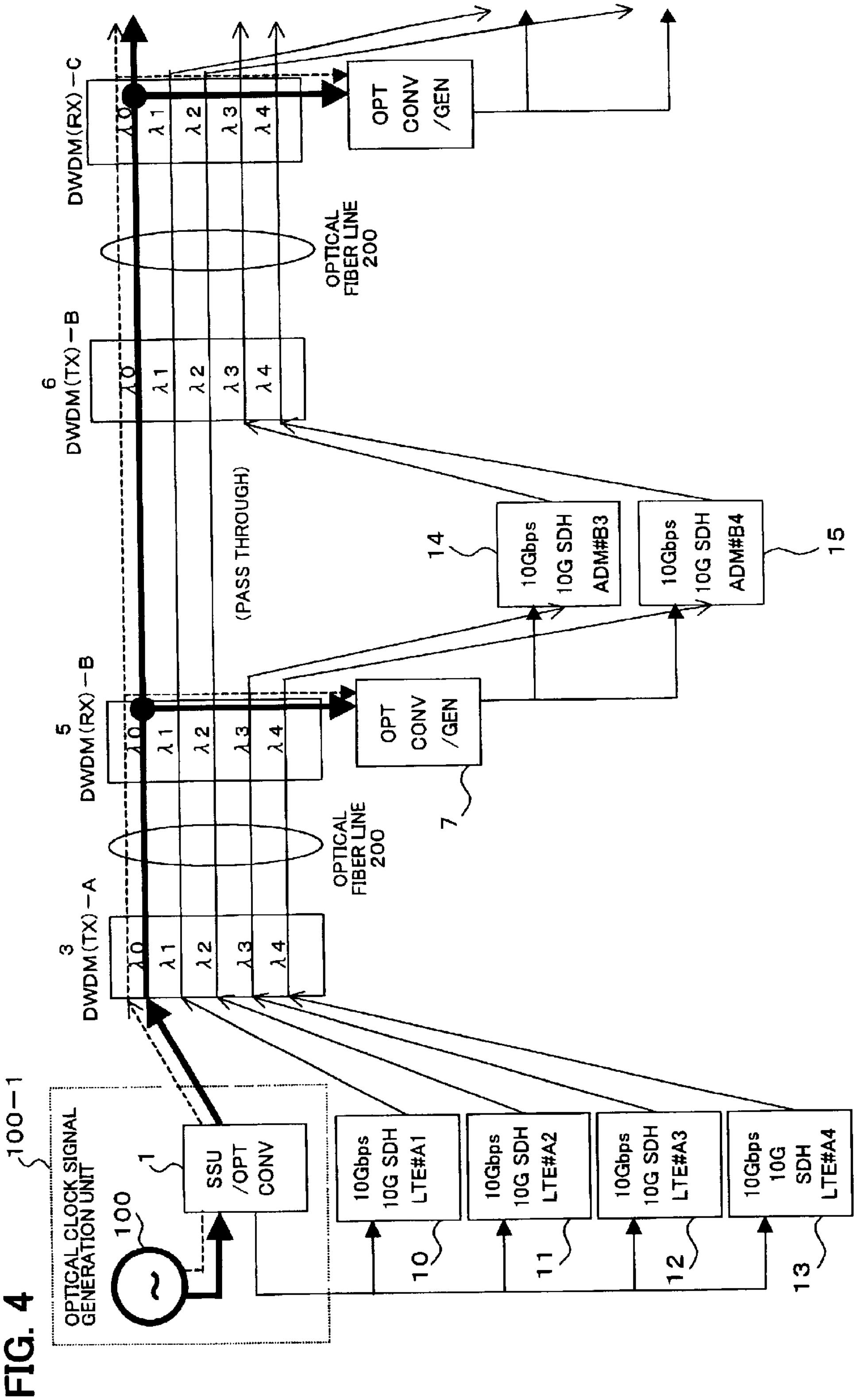
FIG. 4 shows an embodiment of the present invention illustrating an example of transmission by wavelength-multiplexing an optical signal on an optical fiber line.

FIG. 4 shows an embodiment of the present invention, in which an optical signal is wavelength-multiplexed to transmit on an optical fiber line 200. In the system of this embodiment, 10 Gbps signals for transmission are optically multiplexed into 32 wavelengths. In the figure, only four waves out of 32 waves are illustrated.

In this FIG. 4, clock source 100 constitutes an optical clock signal generation unit 100-1 together with optical clock signal generator 1. An optical clock signal being converted into an optical signal from a reference clock constituted by an electric clock of, for example, 10 MHz generated from clock source 100 constituting optical clock signal generation unit 100-1 is transmitted through an optical clock signal transfer route shown by bold lines.

Namely, the reference clock is converted into a corresponding optical clock signal in optical clock signal generator 1, to branch without modification for distributing to each unit in a similar manner. Thus the quality level of the reference clock distributed to the entire units can be maintained equally.

In FIG. 4, an optical clock signal having wavelength of λ0 being output from optical clock signal generator 1 is input to wavelength multiplexing unit 3 on the transmission side.

In transmission terminals (A1–A4) 10–13, data signals of 10 Gbps are respectively converted into optical signals having wavelengths λ1–λ3 referenced by an electric clock signal being output from clock source 100.

Accordingly, wavelength multiplexing unit 3 on the transmission side transmits through optical fiber cable 200 wavelength-multiplexed signals containing both optical signals having wavelength of λ1–λ3 and the optical clock signal having wavelength of λ0 generated from optical clock signal generation unit 100-1.

A wavelength multiplexing unit 4 on the reception side has an optical filtering function to demultiplex the wavelength-multiplexed optical signal on a per wavelength basis to forward to each corresponding unit. Namely, wavelength multiplexing unit 4 on the reception side makes the optical clock signal having wavelength λ0 to branch, and converts the branch signal into an electric signal in optical/electric signal converter 7 to input to ADM units 14, 15.

The optical signals having wavelength λ3, λ4 are made to branch to input to ADM units 14, 15. The branching optical signals having wavelengths λ3, λ4 are processed being referenced by the optical clock signal having wavelength λ0.

Meanwhile, the optical clock signal having wavelength λ0 passes through wavelength multiplexing unit 4 on the reception side. The optical clock signal is wavelength-multiplexed on the transmission side with wavelengths λ3, λ4 corresponding to data inserted by ADM units 14, 15 in wavelength multiplexing unit 6, to forward to a succeeding node. Similar process is carried out in the succeeding node.

In such a system shown in FIG. 4, the whole network operates in synchronization with the highly accurate optical clock signal, thus enabling to improve clock accuracy of the network as a whole. Therefore, noise accumulation by individual PLL circuits in the ADM units which occurs in the conventional method is not produced.

Additionally, in the embodiment shown in FIG. 4, dotted lines denote a flow of indication information, which enables to transfer, for example, alarm information which will be described later by inserting additional information into the optical clock signal of wavelength λ0.

In the system shown in FIG. 4 also, as a feature of the present invention, clock distribution in the network is transmitted through a different optical signal from the main signal to distribute. According to this invention, a reference clock being output from a cesium atomic oscillator provided as clock source 100 is converted into an optical clock signal without modification to distribute throughout the network.

Further, when distributing the clock, it becomes possible to transmit efficiently by using a wavelength multiplexing (WDM) unit to multiplex the reference clock within the same fiber as a main signal line.

Figure 5:
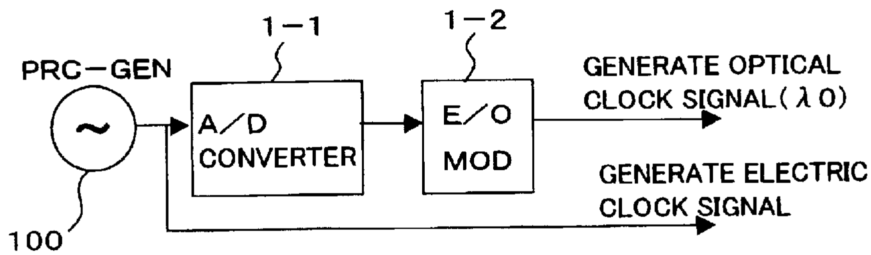
FIG. 5 shows a configuration example of optical clock signal generator shown in FIG. 4.

FIG. 5 is a diagram showing a configuration example of optical clock signal generation unit 100-1 shown in FIG. 4.

Clock source 100 is an oscillator having accuracy no less than PRC specified by ITU-T, for example cesium atomic oscillator or the like.

Optical clock signal generator 1 includes an analog-to-digital converter 1-1 and an electric-optical converter 1-2. Analog-to-digital converter 1-1 converts an analog clock signal being output from high accuracy clock source 100 such as cesium atomic oscillator to a digital signal to forward to electric-optical converter 1-2.

Electric-optical converter 1-2 has a function of converting an input digital clock signal to a light having an arbitrary wavelength. In this example, a digital clock signal is converted into an optical clock signal having a wavelength λ0.

Meanwhile, a reference clock of an electric signal being output from clock source 100 is directly distributed to terminals 10–13 as a clock signal therefor.

As can be seen from this example, by providing an optical clock signal generation function in optical clock signal generation unit 100-1, it becomes possible to input a clock directly into wavelength multiplexing unit 3, and thus enabling wavelength multiplexing unit 3 to perform clock distribution easily.

Figure 6:
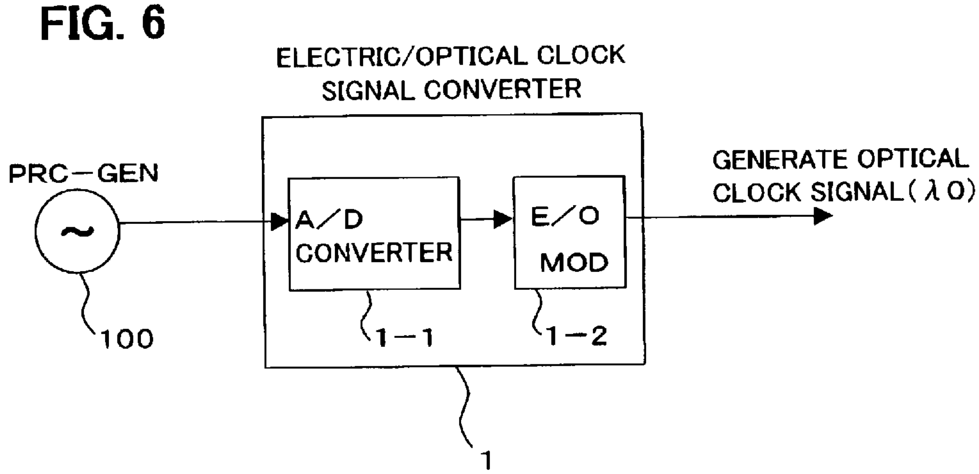
FIG. 6 shows a configuration example constituted by a separate configuration of an independent clock source and an electric/optical clock signal converter in the optical clock signal generator shown in FIG. 4.

In FIG. 6, there is shown a separate configuration of an independent clock source 100 from electric-optical clock signal converter 1. An analog clock signal output from a general-purpose reference clock source 100 is received in electric-optical clock signal converter 1.

In analog-to-digital converter 1-1, an analog clock signal from clock source 100 is converted into a corresponding digital signal. Further, an electric-optical modulator 1-2 converts into an optical signal using the digital signal as a modulation signal.

In this embodiment, each terminal 10–13 shown in FIG. 4 receives the optical signal as a reference clock. For this purpose, an optical-electric (O/E) converter is required in each terminal.

Figure 7:
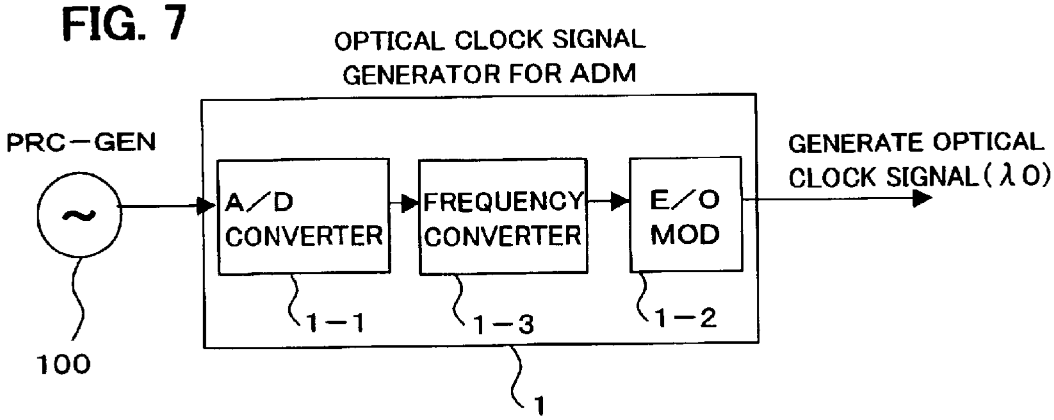
FIG. 7 shows another configuration of an optical clock signal generator.

FIG. 7 is another configuration example of optical clock signal generation unit 100-1. A frequency converter 1-3 is provided for receiving an analog clock signal being output from general-purpose reference clock generation unit 100 to convert into a clock frequency for general use in ADM units, etc.

An electric signal having a frequency being converted by frequency converter 1-3 is converted into an optical clock signal in electric-optical modulator 1-2 to output.

In this embodiment, as described above, an analog clock signal generated in a general-purpose clock source 100 is converted into a clock frequency used in ADM units, etc. to forward as an optical clock signal. Thus, the unit receiving the optical clock signal can use the received clock as a unit clock without conducting frequency conversion. Accordingly, a frequency conversion circuit is not required in such ADM units.

Figure 8:
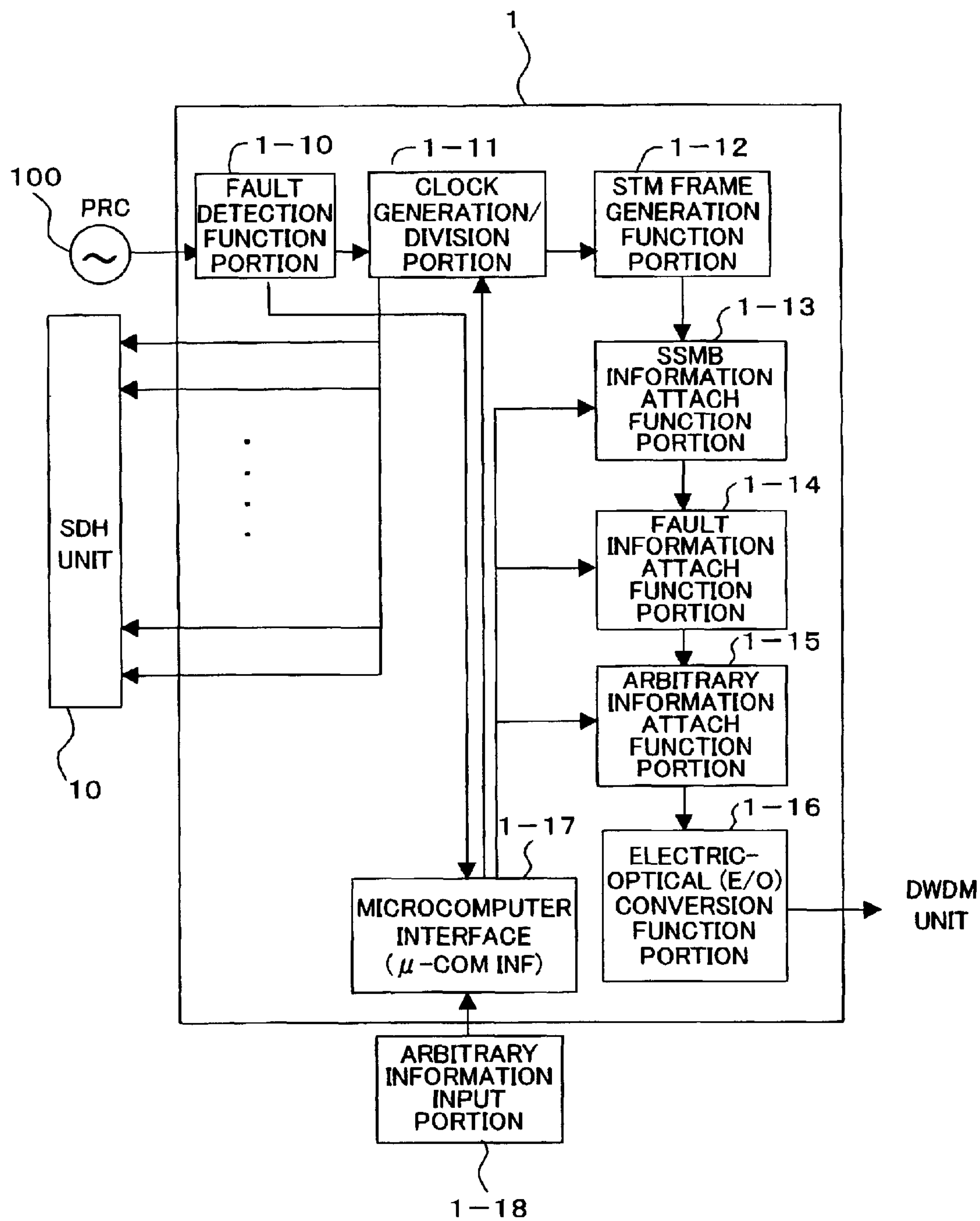
FIG. 8 shows an embodiment of the present invention incorporating an improvement for discriminating an optical clock signal from a data signal because of wavelength-multiplexing the optical clock signal with the data signal wavelength.

FIG. 8 shows an embodiment of improvement for discriminating a data signal from a clock signal because the clock signal is wavelength-multiplexed with the data signal according to the present invention.

In this embodiment, in case that a PRC-level reference clock being output from clock source 100 is multicast in an STM frame (125 μsec), there is provided a function of inserting an indication information such as a data for wavelength discrimination in an overhead (OHB) part of an STM frame so as to discriminate wavelengths for other data as well as to conduct wavelength management.

Also, fault information on clock source 100 is inserted into this indication information to distribute. Similarly, in an overhead (OHB) of a data signal, the relevant wavelength data is inserted in the SDH/SONET system side.

Here, the aforementioned indication information denotes SSMB (Synchronous Status Message Byte) information for indicating a synchronous condition, discrimination information denoting a frequency for distributing a clock, fault information, etc. Here, as an example, a case that both SSMB information and discrimination information on a wavelength for distributing the clock are inserted is explained hereafter.

The portions shown as functional elements of optical clock signal generator (SSU/OPT) 1 in FIG. 8 can be realized by a control program the execution of which is controlled by a microcomputer.

Now, when a fault detection function portion 1-10 detects a fault such as halt of the reference clock being input from clock source 100, the detected fault is reported to a non-illustrated microcomputer through a microcomputer interface (μ-COM INF) 1-17.

In a clock generation/division portion 1-11, the reference clock input from clock source 100 is converted to generate the clock for STM frame and is divided into predetermined frequencies. Thereafter an STM frame is generated in a frame generation function portion 1-12.

In an SSBM information attach function portion 1-13, SSBM information is attached to the generated STM frame overhead by means of microcomputer control through microcomputer interface 1-17. Also, fault information is attached thereto in a fault information attach function portion 1-14. Further, arbitrary information being input from an arbitrary information input portion 1-18 is attached in arbitrary information attach function portion 1-15.

The STM frame to which the aforementioned information has been attached is converted into an optical clock signal in an electric-optical (E/O) conversion function portion 1-16 to output to wavelength multiplexing (DWDM) unit 3.

Also, when a fault is detected in the aforementioned fault detection function portion 1-10, the reference clock is suspended to output from clock generation/division function portion 1-11 for distributing to each SDH unit 30.

In such a way, an optical signal to which indication information (SSMB information) and clock signal discrimination information are applied in optical clock signal generator (SSU/OPT) 1 is transmitted to the neighboring DWDM unit 3.

On receipt of this optical signal, DWDM unit 3 extracts the indication information from the overhead. It is possible to extract from this optical signal the clock signal discrimination information (identifying the signal concerned is a clock distribution signal) and SSMB information related to the clock signal. Accordingly, it becomes possible to recognize reference clock quality information (PRC) being generated and output from clock source 100. Based on these information sets, each unit performs clock extraction to realize network synchronization.

Next, hereafter there is described according to the present invention an embodiment for realizing an SDH/SONET optical transmission unit incorporating an optical clock signal generation function.

Figure 9:
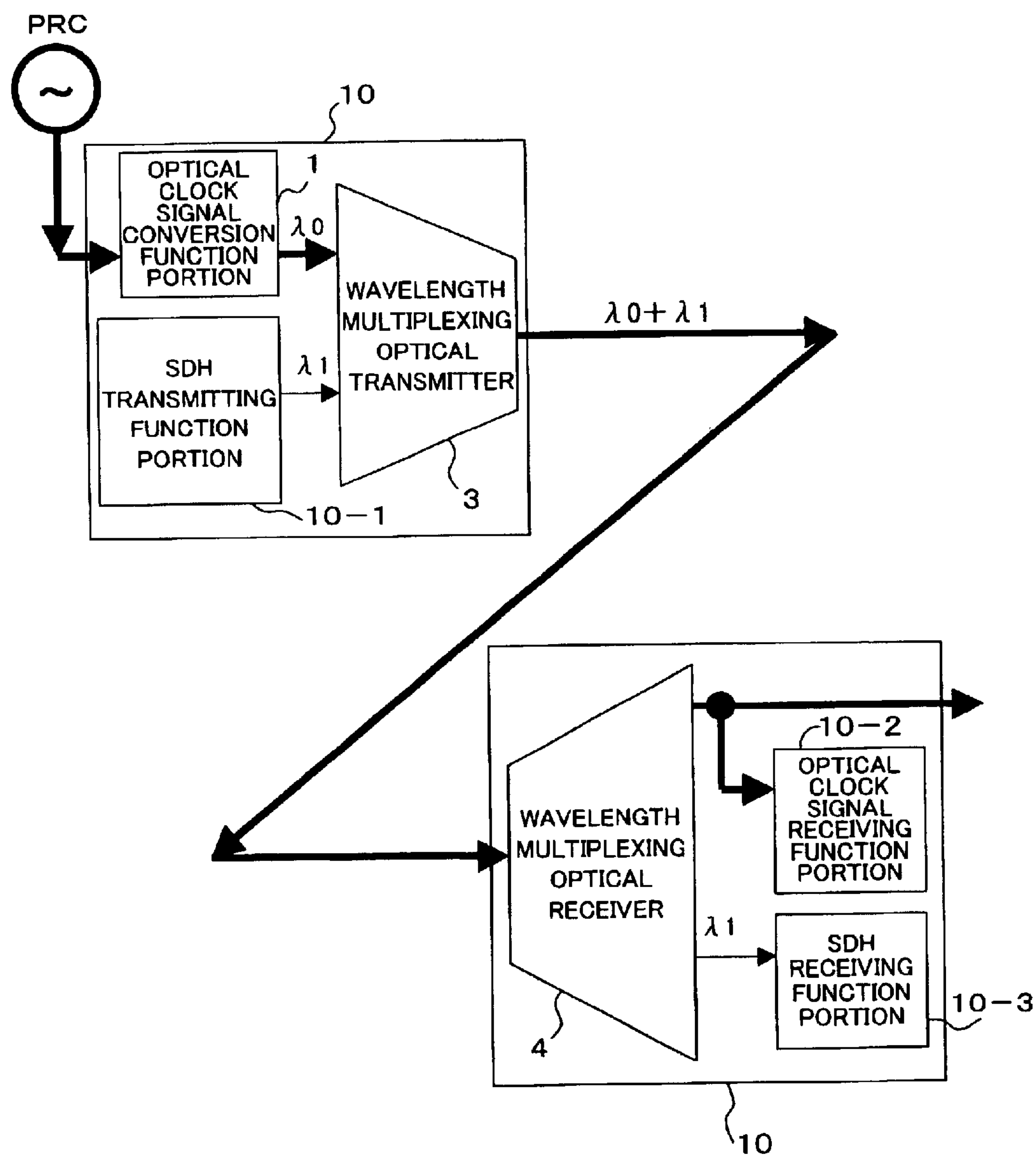
FIG. 9 shows an embodiment of SDH/SONET optical transmission units incorporating a conversion function for generating an optical clock signal.

A configuration example of this embodiment is shown in FIG. 9. In this embodiment, an optical clock conversion function portion 1 is incorporated in an SDH/SONET optical transmission unit 10. An optical clock signal is superposed to the optical main signal data being output from SDH transmitting function portion 10-1 by wavelength multiplexing optical transmitter 3.

Meanwhile, in SDH/SONET optical transmission unit 10 located on the reception side, wavelength λ0 of the optical clock signal and wavelength λ1 of the main signal are demultiplexed in wavelength multiplexing optical receiver 4, to input to an optical clock signal receiving function portion 10-2 and an SDH receiving function portion 10-3, respectively. Thus, a unit for constituting an optical clock signal distribution system is realized.

Here, it is essentially required for a network system to continue data transmission without any interruption even in case a fault occurs so as to improve the system reliability. Therefore, an application example of the present invention with redundant configuration to cope with the aforementioned requirement is explained hereafter.

Figure 10:
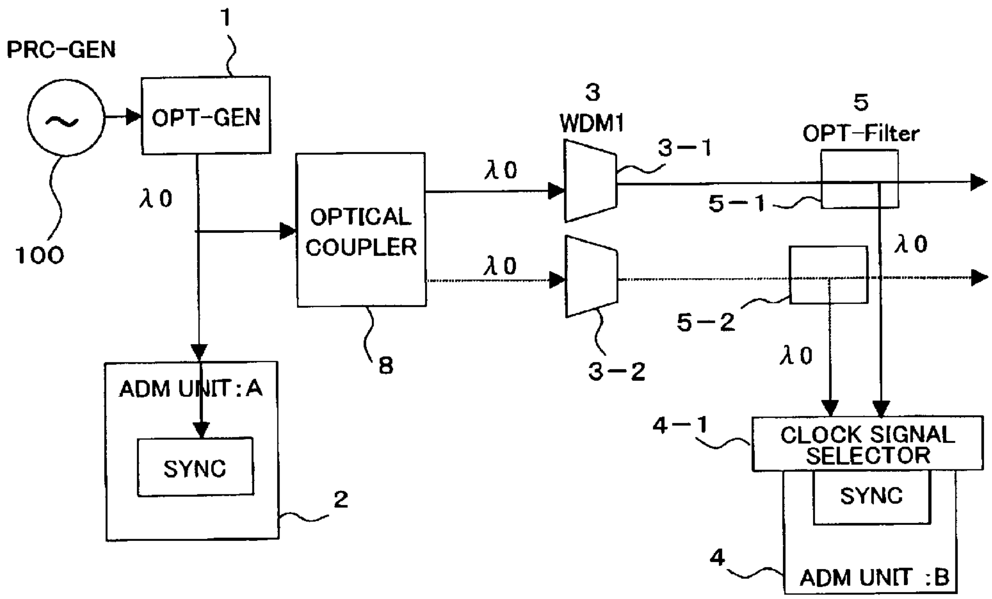
FIG. 10 shows an explanation diagram of an application example of the present invention employing a redundant configuration.

FIG. 10 shows an exemplary system configuration. In optical clock signal generator 1, a PRC-level clock signal from clock source 100 is converted into an optical clock signal of wavelength λ0. This optical clock signal is made to branch in an optical coupler 8 and these branch signals are transmitted through different fiber routes, to form a redundant configuration.

To achieve this configuration, wavelength multiplexing unit 3 includes a work unit 3-1 and a protection unit 3-2. In each work/protection unit 3-1, 3-2, a main signal wavelength incoming from an ADM unit and an optical clock signal wavelength are wavelength-multiplexed in a similar manner to that shown in FIG. 3. This may be applied to any other embodiments described later.

Further, correspondingly to the above, optical filter includes a filter 5-1 for the work side and a filter 5-2 for the protection side. In ADM unit 4, an optical clock signal on either the work side 5-1 or the protection side 5-2 is selectively received in a clock signal selector 4-1.

Figure 11:
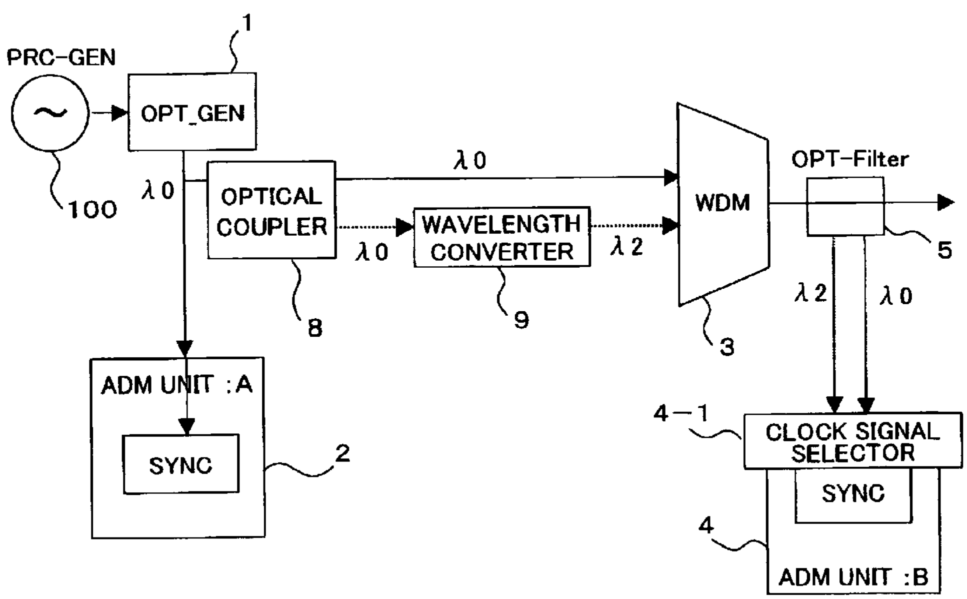
FIG. 11 shows an explanation diagram of an embodiment incorporating another redundant configuration.

FIG. 11 shows an embodiment for implementing another redundant configuration. As contrasted to the embodiment shown in FIG. 10, one side of the optical clock signal of wavelength λ0 branching in optical coupler 8 is input to a wavelength converter 9. The optical clock signal having wavelength λ0 being input to wavelength converter 9 is converted into a different wavelength λ2.

Thereafter, the optical clock signal of wavelength λ0 having branched in optical coupler 8 and the optical clock signal of wavelength λ2 having been wavelength-converted in wavelength converter 9 are wavelength-multiplexed in wavelength multiplexing/demultiplexing unit 3 having a non-redundant configuration and is output.

In ADM unit 4, an optical clock signal of wavelength λ0 and an optical clock signal of wavelength λ2 are input separately, and either one of the optical clock signal is selectively received in clock signal selector 4-1.

Figure 12:
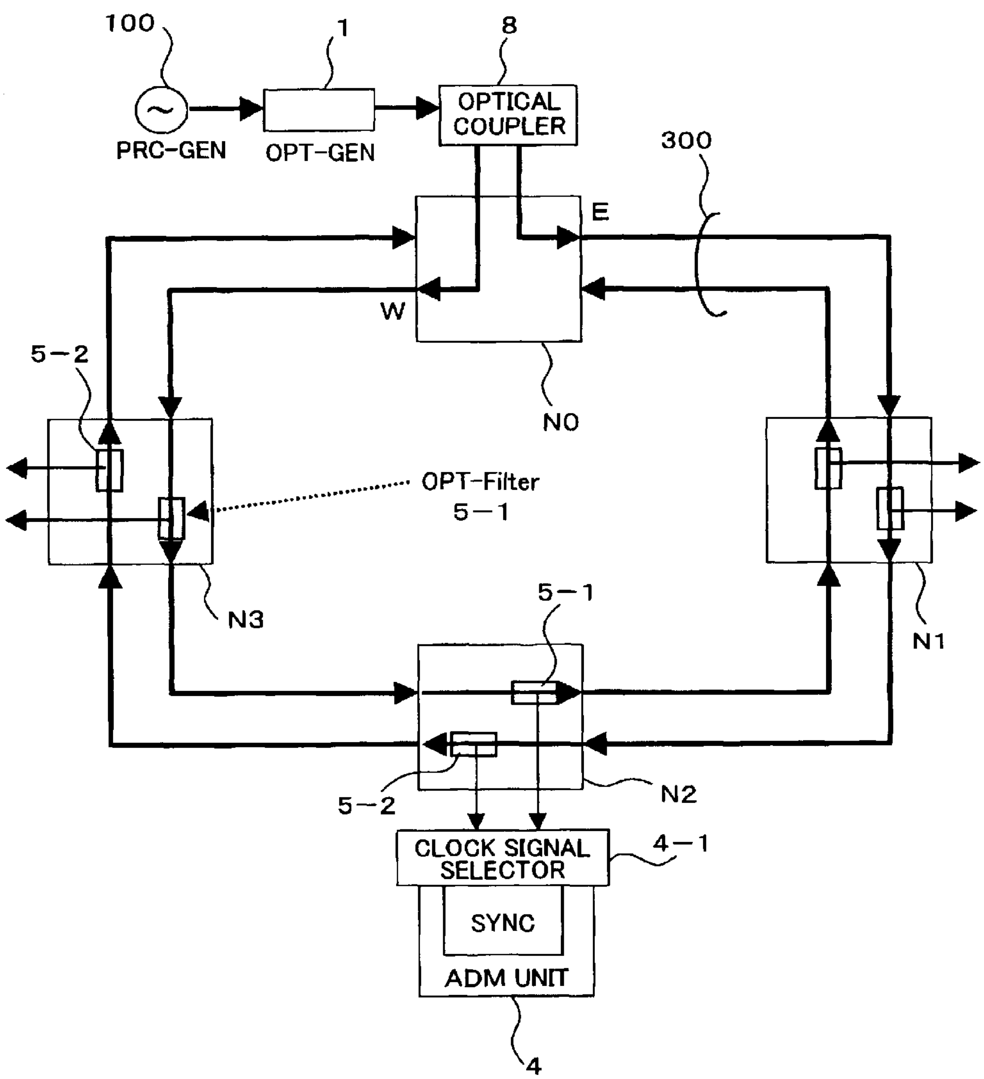
FIG. 12 shows a redundant configuration in which the present invention is applied to a network having a ring configuration.

FIG. 12 shows a redundant configuration in case the present invention is applied to a network of ring configuration.

In FIG. 12, each node N0–N3 is connected in the ring shape by means of a bidirectional optical line 300. In optical clock signal generator 1, a PRC-level reference clock from clock source 100 is converted into an optical clock signal. Thereafter the optical clock signal is forwarded to both clockwise and counterclockwise direction of bidirectional optical line 300 from optical coupler 8.

In each node N0–N3, the optical clock signal having wavelength λ0 is made to branch by optical filters 5-1, 5-2. As an example, in clock selector 4-1 of ADM unit 4, either one of optical clock signal is made to branch. Thus a ring network system enabling a redundant configuration for the optical clock signal is realized.

When a fault occurs on the synchronous clock network in a ring network, network synchronization can be maintained by selecting an optical clock signal being transmitted in the direction opposite to the optical clock signal direction being selected at that time.

Figure 13:
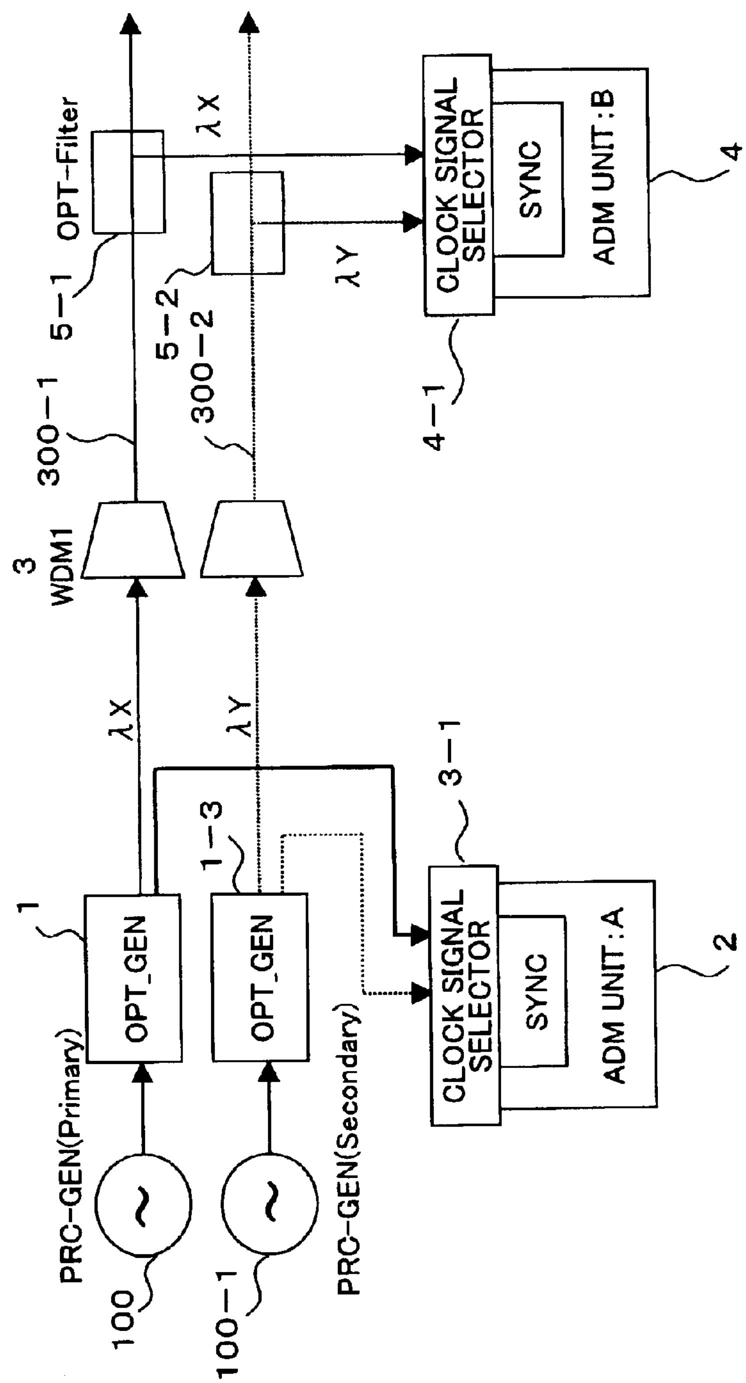
FIG. 13 shows an explanation diagram of an embodiment incorporating another redundant configuration.

FIG. 13 shows an embodiment of still another redundant configuration. In this embodiment, as contrasted to the configuration example shown in FIG. 10, two clock sources 100, 100-1 are provided for outputting PRC-level clock signals: primary clock signal and secondary clock signal in place of optical coupler 8. By means of the corresponding optical clock signal generators 1, 1-3, optical clock signals respectively having wavelengths of λX, λY are generated to output.

The optical clock signals having wavelengths λX, λY are independently transmitted through fiber routes 300-1, 300-2, respectively. These optical clock signals are input into clock signal selector 3-1 of ADM unit 3 directly from optical clock signal generators 1, 1-3, or into clock signal selector 4-1 of ADM unit 4 after branching through optical filters 5-1, 5-2, to select either of the optical clock signals to receive. Such a configuration enables to provide a linear network system capable of being structured with a redundant configuration can be attained.

Figure 14:
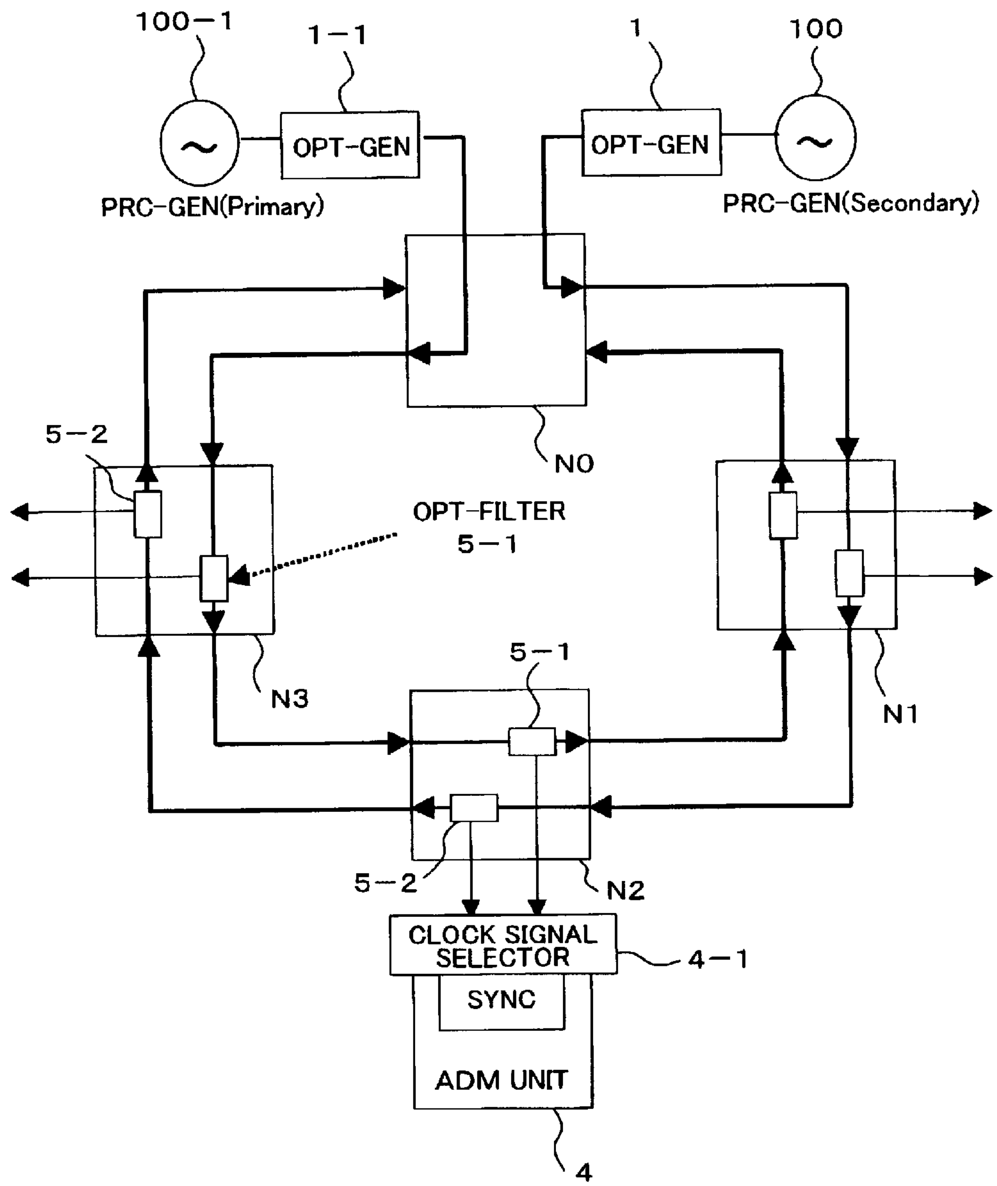
FIG. 14 shows a configuration example in which the configuration shown in FIG. 13 is applied to a network having a ring configuration.

FIG. 14 shows an example in which the embodiment configuration shown in FIG. 13 is applied to a ring configuration network. In the configuration shown in FIG. 12, one optical clock signal from one optical clock signal generator 1 is made to branch in both the clockwise direction and the counterclockwise direction by means of optical coupler 8, to forward to optical fiber transmission lines. By contrast, in the configuration shown in FIG. 15, optical clock signals from independent optical clock signal generators 1, 1-3 are respectively forwarded to either of the two optical fiber transmission lines; one in the clockwise direction and the other in the counterclockwise direction.

Figure 15:
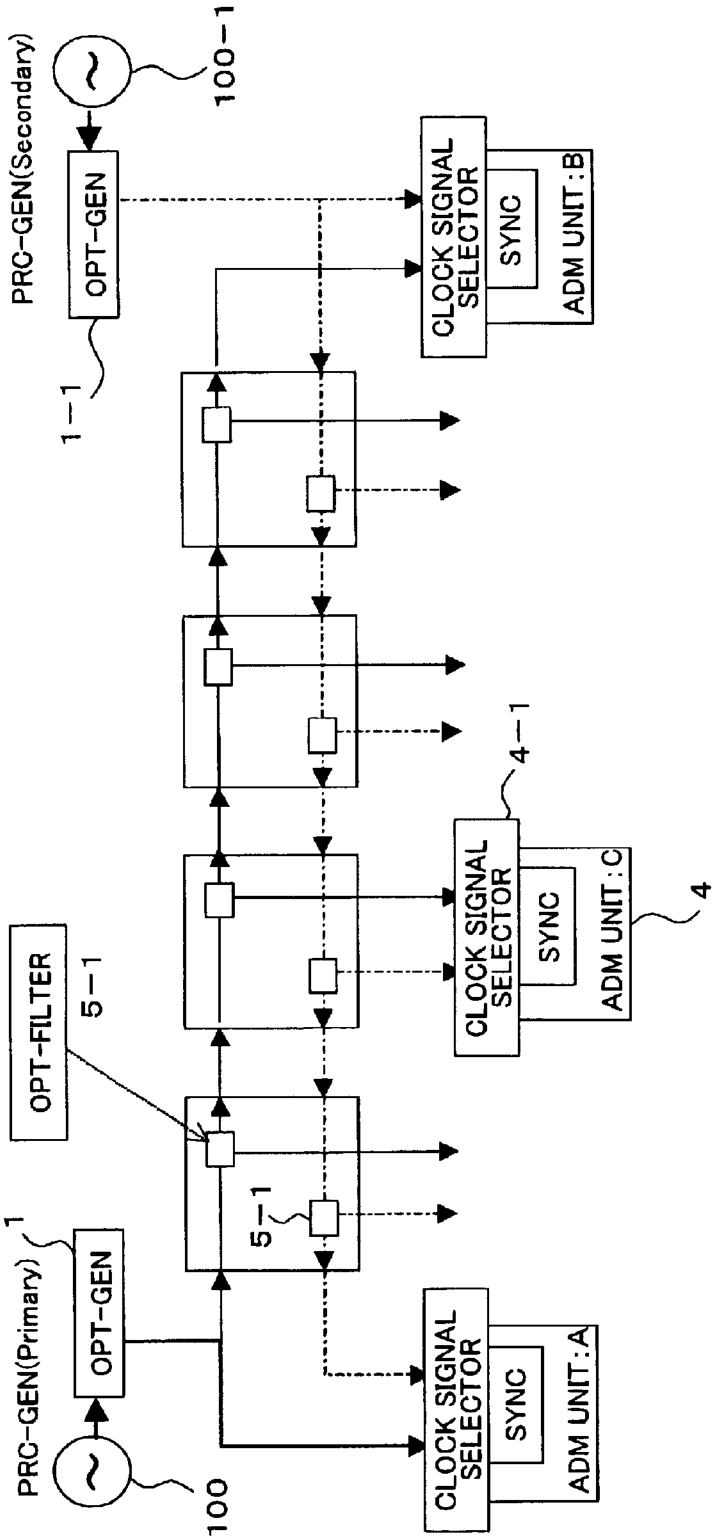
FIG. 15 shows a configuration example constituted by an extended configuration of the embodiment shown in FIG. 13.

FIG. 15 shows a configuration example in which the configuration shown in FIG. 13 is extended. As in the case of embodiments shown in FIGS. 13, 14, there are provided clock sources 100, 100-1 for generating a PRC-level reference clocks for the work side and the protection side, as well as corresponding optical clock signal generators 1, 1-1.

Clock source 100 and optical clock signal generator 1 as well as clock source 100-1 and optical clock signal generator 1-1 are respectively provided at the both end of the network. The optical clock signals are input from both ends of the network to transmit to the opposite ends.

In each ADM unit 4, optical clock signals of the upward direction and the downward direction being separated by optical filters 5, 5-1 are input. When a fault occurs resulting in inability to transmit an optical clock signal from one side, ADM unit 4 switches to select so as to receive the optical clock signal from the opposite direction in clock selector 4-1. Thus it becomes possible to maintain network synchronization and a linear network system capable of a redundant configuration can be attained in a similar manner to the embodiments mentioned earlier.

INDUSTRIAL APPLICABILITY

As the embodiments of the present invention has been described referring to the drawings, according to the present invention, the entire transmission units are synchronized simultaneously against the identical optical clock signal, it becomes possible to provide a network in which response capability (shortening of response time) against a network clock is improved.

In this case, it becomes possible to circumvent an influence caused by the conventional multi-stage connection of the clock between units. It becomes not necessary to consider unit jitter/wander transfer characteristic and thus improved reliability of the clock network can be attained.

Further, according to the present invention, using with wavelength division multiplexing technology, it becomes possible to transmit an optical clock signal through the same optical transmission line as that used for main signal network, and thus the method of the present invention enables to implement without installing another new optical transmission line.

Also, each unit connected with a network synchronizes in one-to-one correspondence with a PRC-level clock signal, resulting in improved clock accuracy. By using only an optical clock signal network as a unit clock source, it becomes possible to omit an inherently unnecessary synchronization circuit of optical signal line (main signal line), in other words to reduce scale of a clock circuit as much as possible.

Still further, by providing a redundant optical clock signal system, network synchronization can be maintained even in case a fault occurs.

It is to be noted that the embodiments of the present invention have been described for purposes of understanding the invention, and therefore the scope of protection in the present invention is not limited to the foregoing description. The description of the claims and the equivalents thereof shall be included in the scope of protection of this invention.

What we claimed is:

1. An optical clock distribution system in a WDM network comprising:

an optical clock generator converting a clock signal of PRC (Primary Reference Clock) level into an optical clock signal having a wavelength λ0;

a wavelength multiplexer wavelength-multiplexing said optical clock signal having wavelength λ0 together with other optical wavelength data;

a wavelength-demultiplexer provided in a unit of said network, wavelength-demultiplexing said optical clock signal having wavelength λ0;

a wavelength converter performing wavelength conversion to said optical clock signal having a wavelength λ0 from said clock signal to which indication information is attached, wherein said other optical wavelength data are processed in said unit of the network using said wavelength-demultiplexed optical clock signal having wavelength λ0 as a reference clock.

2. The optical clock distribution system in the WDM network according to claim 1 further comprising:

a clock source outputting said clock signal of PRC (Primary Reference Clock) level as an electric analog signal, wherein said wavelength converter includes an analog-to-digital converter converting said electric analog signal from said clock source into a digital signal, so that an optical clock signal is configured by modulating said optical signal having wavelength λ0 using said digital signal obtained in said analog-to-digital converter as a modulation signal.

3. The optical clock distribution system in the WDM network according to claim 2 further comprising:

a frequency conversion circuit provided in the succeeding stage of said analog-to-digital converter converting an output of said analog-to-digital converter into a signal having a frequency corresponding to an add drop multiplexing (ADM) unit to which said optical clock signal is to be forwarded.

4. The optical clock distribution system in the WDM network according to claim 1 further comprising:

an optical coupler making said optical clock signal to branch into two branch signals;

a work optical transmission line and a protection optical transmission line separately transmitting either of said two branch optical clock signals produced by said optical coupler; and a clock signal selector provided in said unit in the network selecting either one of said two branch optical clock signals transmitted on said work optical transmission line or said protection optical transmission line, wherein a redundant configuration of said optical clock distribution system is attained.

5. The optical clock distribution system in the WDM network according to claim 4 further comprising:

a wavelength converter wavelength-converting either one of said two branch optical clock signals; and a wavelength multiplexing unit wavelength-multiplexing the other of said two branch optical clock signal with said wavelength-converted optical clock signal obtained from said wavelength converter, wherein optical clock signals for a work side and a protection side are transmitted on a common optical transmission line, so that a redundant configuration of said optical clock distribution system is attained.

6. The optical clock distribution system in the WDM network according to ciaim 4, wherein said network includes a bidirectional optical transmission line of a ring configuration, and wherein said two branch optical clock signals are transmitted mutually in the opposite direction on said bidirectional optical transmission line, so that a redundant configuration of said optical clock distribution system is attained.

7. An optical clock distribution system in a WDM network comprising:

a first clock signal source and a second clock signal source generating a first clock signal and a second clock signal respectively having PRC (Primary Reference Clock) level;

a first optical clock generator and a second optical clock generator respectively converting clock signals being output from said first clock source and said second clock source into optical clock signals having a first wavelength and a second wavelength;

a first optical transmission line and a second optical transmission line transmitting optical clock signals respectively having said first wavelength and said second wavelength being output from said first optical clock generator and said second optical clock generator; and a wavelength-demultiplexer provided in a unit of said network, wavelength-demultiplexing said optical clock signals having said first wavelength and said second wavelength, wherein, further by comprising a clock signal selector provided in said unit of the network for selecting a wavelength-demultiplexed optical clock signal having either said first wavelength or said second wavelength, a redundant configuration of said optical clock distribution system is attained.

8. The optical clock distribution system according to claim 7, wherein said network includes a bidirectional optical transmission line of a ring configuration, and said optical clock signals having said first wavelength and said second wavelength generated from said first optical clock generator and said second optical clock generator are transmitted mutually in the opposite direction, so that a redundant configuration of said optical clock distribution system is attained.

9. The optical clock distribution system in the WDM network according to claim 7, wherein said first clock source and said second clock source as well as said first optical clock generator and said second optical clock generator respectively corresponding to said first and second clock sources are disposed on both ends of said optical transmission lines.

* * * * *